United States Patent
He

(10) Patent No.: US 8,657,198 B2
(45) Date of Patent: Feb. 25, 2014

(54) END USER-CUSTOMIZABLE DATA CAPTURE TERMINAL FOR AND METHOD OF IMAGING AND PROCESSING TARGET DATA

(75) Inventor: Duanfeng He, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 36 days.

(21) Appl. No.: 13/075,330

(22) Filed: Mar. 30, 2011

(65) Prior Publication Data

US 2012/0248189 A1    Oct. 4, 2012

(51) Int. Cl.
*G02B 26/10*    (2006.01)

(52) U.S. Cl.
USPC ............. 235/462.25; 235/462.01; 235/462.09

(58) Field of Classification Search
USPC .............. 235/462.25, 462.01, 462.09, 462.11
See application file for complete search history.

(56) References Cited

U.S. PATENT DOCUMENTS

| 6,123,263 | A  | * | 9/2000 | Feng | 235/462.42 |
| 7,108,187 | B2 | * | 9/2006 | Turvy et al. | 235/462.08 |
| 7,275,694 | B2 | * | 10/2007 | Longacre, Jr. | 235/462.07 |
| 2004/0262392 | A1 | | 12/2004 | Longacre, Jr. et al. | |
| 2009/0200380 | A1 | * | 8/2009 | Longacre et al. | 235/462.11 |

OTHER PUBLICATIONS

International Search Report and Written Opinion for counterpart International Patent Application No. PCT/US2012/028682 mailed on Jun. 18, 2012.

* cited by examiner

*Primary Examiner* — Ahshik Kim
(74) *Attorney, Agent, or Firm* — Nong-Qiang Fan

(57) ABSTRACT

A data capture terminal for, and a method of, processing one or more target data, such as symbols, arranged at spaced-apart locations on a target, employ an electro-optical reader for electro-optically reading the data on the target, and a controller for processing at least one of the data, and for determining whether the at least one data has been successfully processed. An interpretation engine customizes the controller with user-selected logic. The interpretation engine is operative, preferably after the at least one data has been successfully processed, to instruct the controller with logical conditions under which the other data on the target is to be processed.

14 Claims, 5 Drawing Sheets

| CODE TYPE | DECODE LENGTH | DECODE STRING | META DATA (LOCATION, ETC.) |
|---|---|---|---|
| CODE 128 | 8 | "123456789012" | . . . |
| <EOF> | – | – | – |
| CODE 128 | 8 | "123456789012" | . . . |
| PDF 417 | 108 | "LIN123456789012; NAMSMITH,JOHN; DOB02291904..." | . . . |
|  |  |  |  |

*FIG. 5*

END USER-CUSTOMIZABLE DATA CAPTURE TERMINAL FOR AND METHOD OF IMAGING AND PROCESSING TARGET DATA

DESCRIPTION OF THE RELATED ART

Solid-state imaging systems or imaging readers have been used, in both handheld and hands-free modes of operation of data capture terminals, to capture images from targets having diverse types of target data, such as one- and two-dimensional bar code symbols to be electro-optically decoded and read and/or non-symbols to be processed for storage or display. Bar code symbols have different bar and space patterns that are used to represent different characters. Sets of these patterns are grouped together to form a symbology. There are many types of bar code symbologies, each having their own special characteristics and features. Most symbologies are designed to meet the needs of a specific application or industry.

One omnipresent symbology is the Universal Product Code (UPC), which is comprised of a one-dimensional linear arrangement of bars and spaces (each termed as an element) of various widths that, when decoded, uniquely identify a product and its manufacturer. Other symbologies include, by way of non-limiting example, Code 128, Interleaved 2 of 5, Discrete 2 of 5, IATA 2 of 5, MSI and PDF-417. Symbols of different symbologies can be found at different locations on a single target, such as a driver's license where a one-dimensional Code 128 and a two-dimensional PDF-417 are provided typically at the back of the license. Non-symbols can include any person, place or thing, especially an alphanumeric address and a signature or seal that signifies receipt and acceptance of a transaction, such as a parcel delivery. Both symbols and non-symbols can be found at different locations on a single target, such as a parcel delivery label.

The imaging reader includes a solid-state imager having an array of photocells or light sensors, which correspond to image elements or pixels in a field of view of the imager, an illuminating light assembly for illuminating the field of view with illumination light from an illumination light source, e.g., one or more light emitting diodes (LEDs), and an imaging lens assembly for capturing return ambient and/or illumination light scattered and/or reflected from the target data being imaged over a range of working distances. Such an imager may include a one- or two-dimensional charge coupled device (CCD) or a complementary metal oxide semiconductor (CMOS) device and associated circuits for producing electronic analog signals corresponding to a one- or two-dimensional array of pixel information over the field of view. The imager is analogous to the imagers used in electronic digital cameras.

When the target data is a symbol, signal processing circuitry including a digitizer is used for digitizing the analog signal, and a programmed microprocessor or controller is used for processing and decoding the digitized signal based upon a specific symbology used for the symbol. When the target data is a non-symbol, the signal processing circuitry will typically de-skew the captured image, re-sample the captured image to be of a certain size, enhance the quality of the captured image, and compress the captured image prior to transmission to a memory or a remote host. It is known to use the imager for capturing a monochrome image of the symbol, and to use the imager with multiple buried channels for capturing a full color image of the symbol. It is common to provide a two-dimensional CCD with a 640×480 resolution commonly found in VGA monitors, although other resolution sizes are possible.

When a known data capture terminal having an imaging reader of the prior art acquires an image of a target that has a plurality of target data or symbols, a particular end user or purchaser of the terminal may not have need of, or want, the information contained in all the symbols. Thus, in the case of the above-mentioned driver's license, an end user may only want the information contained in the PDF-417 symbol. This end user may not wish to wait for the other Code 128 symbol to be decoded, or to waste the terminal's resources on decoding the Code 128 symbol. On the other hand, a different end user may only want the information contained in the Code 128 symbol. Other end users may want both these symbols to always be decoded, but only in a certain order or format.

However, the known terminals of the prior art have a fixed operational configuration set by the manufacturer. This inflexibility means that some users will always be unsatisfied with sacrificed performance. It would be desirable for the end users or purchasers of such terminals to be able to customize their terminals after delivery from the manufacturer. For example, one user may wish to capture data in a certain order, or may wish to capture only certain data. Another user may have totally different requirements for capturing different data in a different order. Any particular user's requirements may change over time. Yet, the fixed configuration of the known terminals does not allow the user to meet such changing requirements without having to involve the manufacturer for reconfiguration, with undesirable concomitant delays and possible service interruption.

It is possible for the known terminals of the prior art to try to accommodate these different users' needs to some degree, as long as the differentiating factors can be expressed as simple numbers, or so-called "parameters", such as enabling/disabling a symbology, or decoding symbols belonging to a particular symbology, but only within certain length limits. It is difficult, if not impossible, to specify a set of logical steps that determine the outcome of a decision, such as whether to proceed to decode more symbols, or to terminate the decode process, based on the decoded data available to the terminal at the moment that calls for such a determination.

Another prior art approach makes use of customized firmware, in which a particular user's logic is coded, in addition to the common standard code applicable to all users. Such a solution is very flexible in the sense that any logic, however complex it might be, can be realized. However, such a solution is also very inflexible, in the sense that the user must get a specialized firmware, which encodes a logic that, although correctly specified at one point in time, might not meet its on-going business needs; and in the sense that, as the terminal manufacturer comes up with updated standard firmware, including new features and bug fixes, the user with a custom firmware might be left behind without an upgrade path.

SUMMARY OF THE INVENTION

One feature of the present invention resides, briefly stated, in a data capture terminal for processing at least one datum, and preferably a plurality of data, especially but not necessarily, symbols of different symbologies, and/or alphanumeric text and/or handwritten signatures, and/or pictures. All of this data are arranged at spaced-apart different locations on a single target, such as a driver's license or a parcel delivery label or form.

The terminal includes an electro-optical reader for reading the data. Preferably, the reader is a solid-state imager having an array of image sensors for capturing return light from the plurality of data on the target over a field of view. Preferably, the imager is a CCD or a CMOS with a rolling or a global shutter. The array may be one-dimensional, i.e., linear arranged along a single row, or two-dimensional having mutually orthogonal multiple rows and columns. Preferably, an actuator, such as a manually depressable trigger, is provided on the terminal for actuating the imager to capture the return light from the plurality of data on the target in a single actuation or trigger pull.

The terminal also includes a microprocessor or controller operatively connected to the actuator and the imager, and operative for processing at least one of the data from the return light captured by the imager, preferably in response to the single actuation. When the data is a symbol, the controller decodes the symbol and determines when the symbol has been successfully decoded.

In accordance with this invention, an interpretation engine is provided for customizing the controller with user-selected logic. The interpretation engine is operative, preferably but not necessarily, after the symbol has been successfully decoded, to instruct the controller with logical conditions under which the other data on the target is to be processed. For example, the interpretation engine could instruct the controller to cease, or to continue, processing the other data after the symbol has been decoded. When a plurality of symbols with different symbologies are on the acquired image, the interpretation engine could instruct the controller to continue processing until a symbol with a known one of the symbologies has been processed.

End users or purchasers of such terminals can now customize their terminals after delivery from the manufacturer with the aforementioned logical conditions to capture only selected data, or to capture multiple data, and output such data in any desired order, or in a form that combines the multiple data, to satisfy the user's changing requirements, thereby avoiding the prior art drawback of having to involve the manufacturer for customized reconfiguration, with undesirable concomitant delays and not being able to make use of the most up-to-date firmware update. No customized firmware is needed. Standard firmware can be released and upgraded.

Another feature of the present invention resides in a method of processing at least one datum, and preferably a plurality of data arranged at spaced-apart locations on a target, which is performed by electro-optically reading the plurality of data on the target, processing at least one of the data with a controller, having the controller determine whether the at least one data has been successfully processed, customizing the controller with user-selected logic, and instructing the controller, preferably after the at least one data has been successfully processed, with logical conditions under which the other data on the target is to be processed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a table explaining operation of the terminal of FIG. 1.

DETAILED DESCRIPTION OF THE PREFERRED EMBODIMENTS

Figure 1:
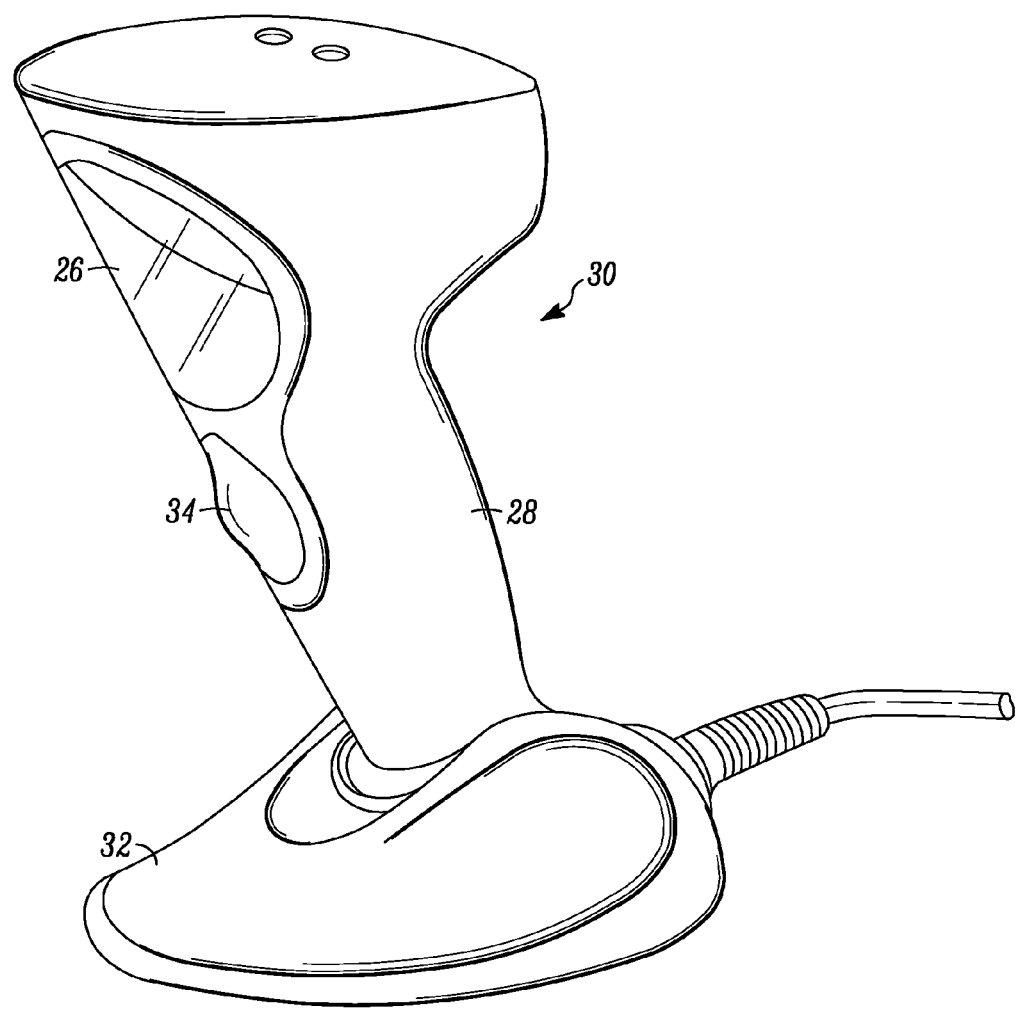
FIG. 1 is a perspective view of a portable data capture terminal operative in either a handheld mode, or a hands-free mode, for capturing return light from target data.

Reference numeral 30 in FIG. 1 generally identifies a data capture terminal having a generally upright window 26 and a gun-shaped housing 28 supported by a base 32 for supporting the terminal 30 on a countertop. The terminal 30 can thus be used in a hands-free mode as a stationary workstation in which a target is slid, swiped past, or presented to, the window 26, or can be picked up off the countertop and held in an operator's hand and used in a handheld mode in which the terminal is moved, and a trigger 34 is manually depressed to initiate imaging of target data, especially one or more symbols of the same or different symbologies (see FIG. 3), and/or alphanumeric text, and/or a handwritten signature or a stamped seal, and/or pictures, to be read at a distance from the window 26. In another variation, the base 32 can be omitted, and housings of other configurations can be employed. A cable, as illustrated in FIG. 1, connected to the base 32 can also be omitted, in which case, the terminal 30 communicates with a remote host by a wireless link, and the terminal is electrically powered by an on-board battery.

Figure 2:
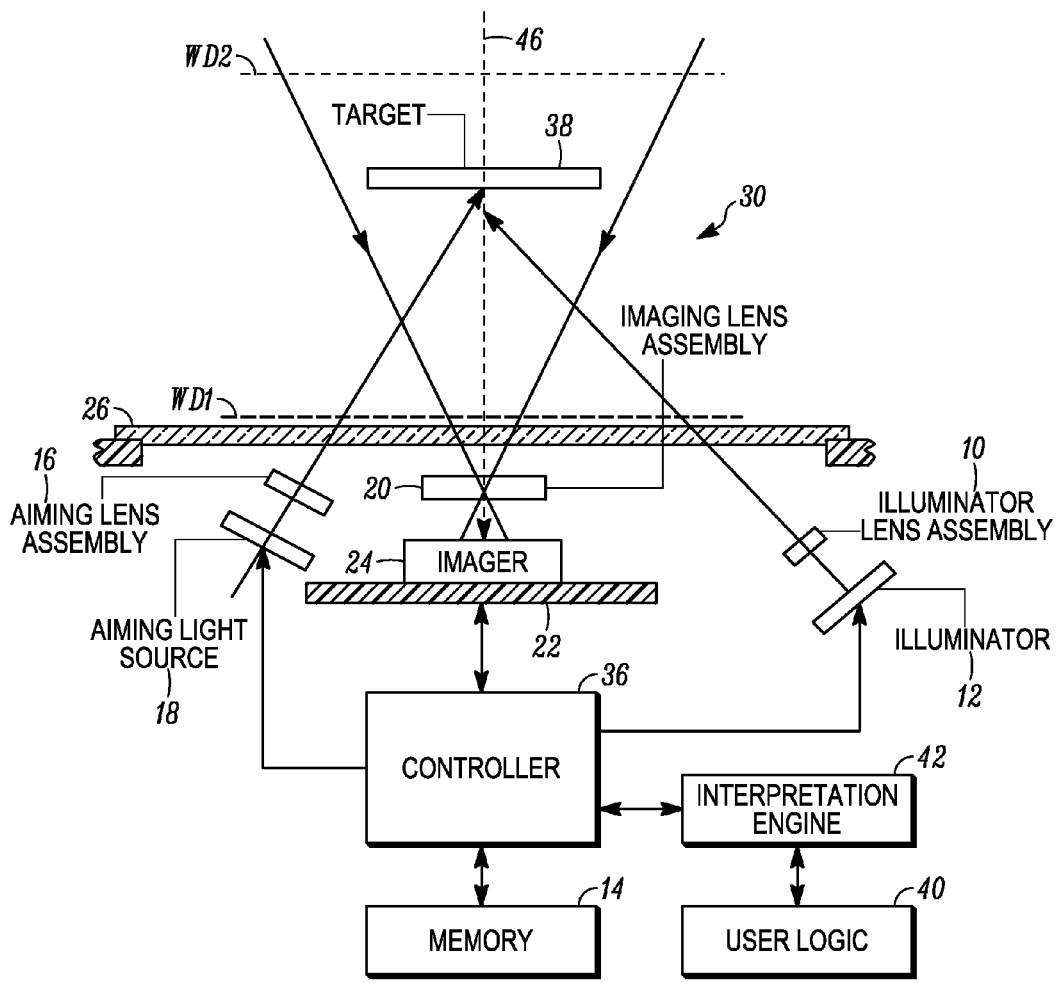
FIG. 2 is a schematic diagram of various components of the terminal of FIG. 1.

As schematically shown in FIG. 2, an imager 24 is mounted on a printed circuit board 22 in the terminal. The imager 24 is a solid-state device, for example, a CCD or a CMOS imager having a one-dimensional array of addressable image sensors or pixels arranged in a single, linear row, or a two-dimensional array of such sensors arranged in mutually orthogonal rows and columns, and operative for detecting return light captured by an imaging lens assembly 20 along an optical path or axis 46 through the window 26. The return light is scattered and/or reflected from the data on a target 38 as pixel data over a two-dimensional field of view. The imaging lens assembly 20 is operative for adjustably focusing the return light onto the array of image sensors to enable the data on the target 38 to be imaged. The target 38 is located anywhere in a working range of distances between a close-in working distance (WD1) and a far-out working distance (WD2). In a preferred embodiment, WD1 is about four to six inches from the imager array 24, and WD2 can be over one foot away from the window 26.

An illuminating assembly is also preferably mounted in the terminal and preferably includes an illuminator or illuminating light source 12, e.g., a light emitting diode (LED), and an illuminating lens assembly 10 to uniformly illuminate the data on the target 38 with an illuminating light having an intensity level over an illumination time period. The light source 12 is preferably pulsed.

An aiming assembly is also preferably mounted in the imaging terminal and preferably includes an aiming light source 18, e.g., an LED or a laser, and an aiming lens assembly 16 for generating a visible aiming light pattern on the target 38. The aiming pattern is useful to help the operator accurately aim the terminal at the target 38.

As shown in FIG. 2, the imager 24, the illuminating light source 12 and the aiming light source 18 are operatively connected to a controller or programmed microprocessor 36 operative for controlling the operation of these components. Preferably, the controller 36 is operative for processing the return light from at least one of the data on the target 38, and for decoding the captured target image when the target data is a bar code symbol, all under the guidance of an interpretation engine 42 to which user-selected logic 40 has been loaded, as described below. A memory 14 is accessible by the controller 36 for storing the interpretation engine 42 and for storing and retrieving processed data. In accordance with this invention, the terminal is customized by the interpretation engine 42 that advises the controller 36 of the user-selected logical conditions 40 under which the processing of the return light is to be performed. The user-selected logic 40 is uploaded to, and stored in, the memory 14 prior to data capture.

In operation, the controller 36 sends a command signal to energize the aiming light source 18 prior to reading, and also pulses the illuminating light source 12 for the illumination time period, say 500 microseconds or less, and energizes and exposes the imager 24 to collect light, e.g., illumination light and/or ambient light, from the target 38 during an exposure time period. A typical array needs about 16-33 milliseconds to acquire the entire target image and operates at a frame rate of about 30-60 frames per second.

Figure 3:
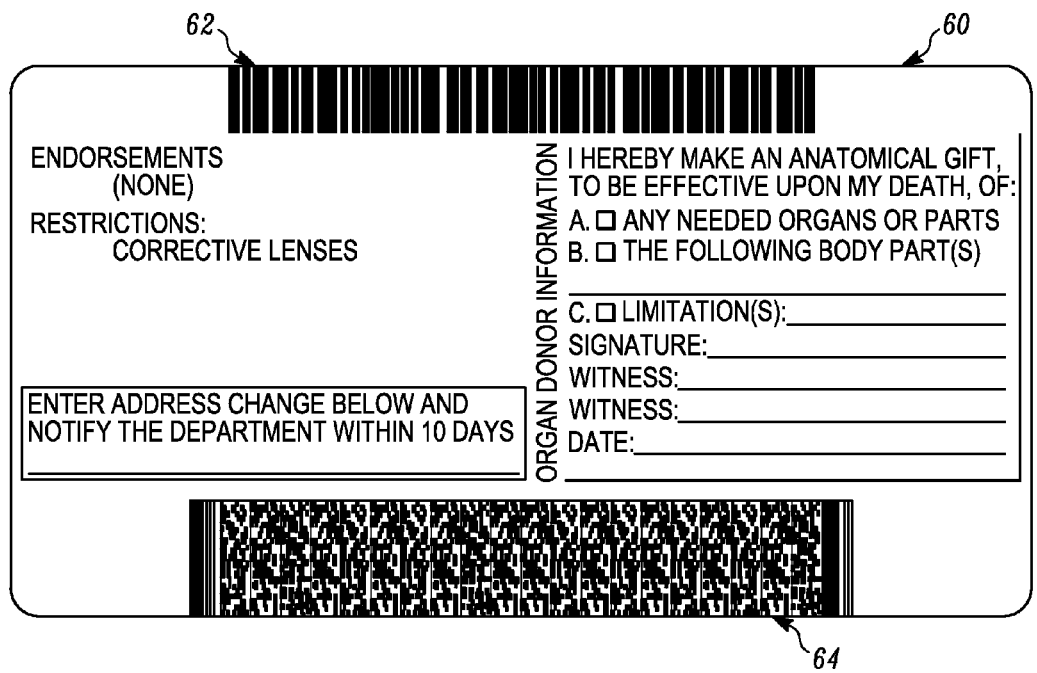
FIG. 3 is a view of a driver's license depicting such target data as two different bar code symbols.

As shown in FIG. 3, one preferred embodiment of the target 38 is a driver's license 60 that includes, among other things, a one-dimensional symbol 62 having a specific symbology, e.g., Code 128, and containing information indicative of a driver's identity, and a different datum or two-dimensional symbol 64 having a different symbology, e.g., PDF-417, and containing much more information. The symbols 62, 64 are arranged at the illustrated spaced-apart locations or areas on the license 60.

In accordance with this invention, the interpretation engine 42 modifies and customizes the operation of the controller 36 with the user-selected logic 40. Preferably, after the controller 36 processes the return light captured by the imager 24 and decodes one of the symbols, e.g., symbol 62, preferably in response to a single actuation of the trigger 34, the controller 36 now knows the conditions under which the other data, e.g., symbol 64, on the target is to be processed. For example, the interpretation engine 42 could instruct the controller 36 to cease, or to continue, processing the symbol 64, preferably but not necessarily after the symbol 62 has been decoded, and after the decoded data has been taken into consideration. Alternatively, the interpretation engine 42 could instruct the controller 36 to continue processing until a symbol with a known one of the symbologies has been processed. Other logical scenarios are contemplated.

End users or purchasers of such terminals can now customize their terminals after delivery from the manufacturer with the aforementioned logical conditions to capture only selected data, or to capture multiple data, and output such data in any desired order, and in a form that combines the multiple data, to satisfy the user's changing requirements, thereby avoiding the prior art drawback of having to involve the manufacturer for customized reconfiguration, with undesirable concomitant delays and not being able to make use of the most up-to-date standard firmware upgrade.

Figure 4:
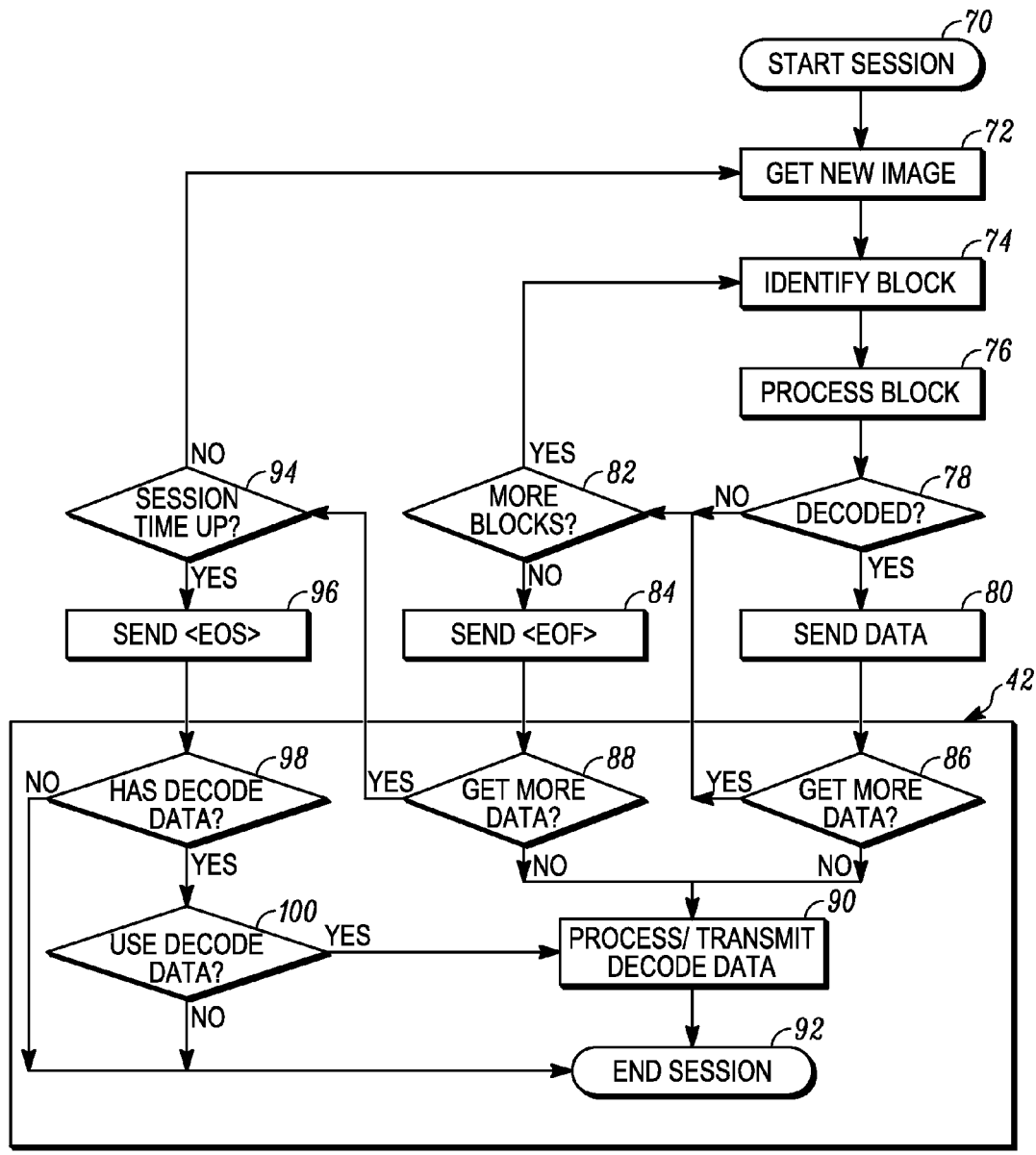
FIG. 4 is a flow chart explaining operation of the terminal of FIG. 1 in accordance with this invention.

FIG. 4 is a flow chart depicting the method of this invention. Starting at start session step 70, the programmed controller 36 is operative at step 72 for capturing an image of all the target data on the license 60. At step 74, the controller 36 is operative for detecting a symbol area or block on the license 60. At step 76, the controller 36 is operative for processing the block. At step 78, the controller 36 is operative for decoding the processed block. If the processed block does not decode a complete symbol, e.g., symbol 62, then step 82 is performed to identify and process more blocks. Once the symbol 62 has been decoded in step 78, the controller 36 sends the data in step 80 to the interpretation engine 42 in which the user logic 40 is loaded. If no more blocks are available for processing, or required in order to adequately cover the image, then the controller in step 84 sends an end-of-frame (EOF) message to the interpretation engine 42.

The interpretation engine 42 in steps 86, 88 determines whether any more data is required. If, for example, it is not required to decode symbol 64, then the controller 36 is instructed to process and transmit the decoded data in step 90 and end the session in step 92. If more data from symbol 64 is required, then the controller 36 checks at step 94 whether the data capture session time has elapsed. If not, then the controller 36 attempts to capture another image at step 72. If the time has elapsed, then the controller 36 ends the data capture session at step 96 by sending an end-of-session (EOS) message to the interpretation engine 42. If the interpretation engine 42 determines that decode data is present at step 98, then the interpretation engine 42, in consultation with the user logic 40, determines whether the decode data should be sent out at step 100, and if affirmative, sends the decode data to be processed and transmitted at step 90 before the session in ended at step 92. If the user logic 40 determines that the decoded data should not be sent out at step 100, then control is passed at step 92 directly, where the session is ended.

FIG. 5 is a table depicting the method of this invention. This table could be stored for the user logic 40 to process. On the first table row, a Code 128 symbol is detected. If this is not all that the user logic 40 wants, but the image was finished without finding the data that the user logic 40 requires, then an EOF message is generated at row 2, from the processing step 84 of FIG. 4. If the end user wants a PDF 417 symbol, then the user logic 40 continues the processing.

In the next frame, or image, the same Code 128 symbol is decoded again, in row 3, before a PDF 417 symbol is decoded at row 4. At this point, the user logic 40 may determine that sufficient data has been acquired and that the processing should stop, taking the pathway from step 86 to step 90 in FIG. 4. On the other hand, if through examination, the user logic 40 can determine, after the result of row 1 becomes available, either that the data requirement has been met, or that extra waiting might not yield more data, then it may take the pathway between steps 86 and 90 of FIG. 4 directly at this point, and rows 2 through 4 would never be made available through additional processing. This latter type of determination could be made if, for example, the user logic 40 can determine, through the examination of the data in row 1, that the Code 128 symbol belongs to a type of driver's license which does not contain a PDF-417 symbol.

It will be understood that each of the elements described above, or two or more together, also may find a useful application in other types of constructions differing from the types described above. For example, this invention is not to be limited solely to detecting the Code 128 symbology or the PDF-417 symbology as the known specific symbology, or solely to detecting only two symbols on a target, or solely to the logic described above, or solely to the field of drivers' licenses. Also, this invention is not to be limited solely to data capture terminals whose only function is to image bar code symbols, but could equally well apply to other types of data, as well as to mobile computers, smartphones, or terminals having an imager as one of its subsystems. Nor is this invention intended to be limited to solid-state imagers, since laser-based readers could also be employed.

While the invention has been illustrated and described as a data capture terminal for, and a method of, processing data on a target per single actuation of an actuator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A data capture terminal for processing at least one of a plurality of data arranged at spaced-apart locations on a target, comprising:
    an electro-optical reader for electro-optically reading the at least one data on the target;
    a controller operatively connected to the reader, for processing the at least one data, and for determining whether the at least one data has been successfully processed; and
    an interpretation engine for customizing the controller with user-selected logic, the user-selected logic being located into the interpretation engine after the data capture terminal is delivered from a manufacturer to an end user, the interpretation engine being operative to interpret blocks in the user-selected logic to execute each of the blocks directly, block by block, for instructing the controller with logical conditions under which the other data on the target is to be processed, wherein the user-selected logic includes specifying a set of logical steps that determine the outcome of a decision that includes at least one of (1) whether to proceed to decode more symbols based on decoded data available to the terminal at the moment that calls for the determination of the decision and (2) whether to terminate the decode process based on decoded data available to the terminal at the moment that calls for the determination of the decision.

2. The terminal of claim 1, wherein the reader is a solid-state imager having an array of image sensors for capturing return light from the plurality of data on the target over a field of view.

3. The terminal of claim 1, wherein the at least one data is a symbol on the target; and wherein the controller is operative for processing and decoding the symbol; and wherein the interpretation engine instructs the controller with the logical conditions after the symbol has been decoded.

4. The terminal of claim 3, wherein the interpretation engine is operative for instructing the controller to cease processing the other data after the symbol has been decoded.

5. The terminal of claim 3, wherein the interpretation engine is operative for instructing the controller to continue processing the other data after the symbol has been decoded.

6. The terminal of claim 1, wherein the plurality of data is a plurality of symbols with different symbologies, and wherein the interpretation engine is operative for instructing the controller to continue processing until a symbol with a known one of the symbologies has been processed.

7. The terminal of claim 1, and an actuator for actuating the reader in a single manual action.

8. A method of processing at least one of a plurality of data arranged at spaced-apart locations on a target, comprising the steps of:
    electro-optically reading, by an electro-optical reader, the at least one data on the target;
    processing, by a controller, the at least one data, and the controller determining whether the at least one data has been successfully processed;
    customizing, by an interpretation engine, the controller with user-selected logic, the user-selected logic being located into the interpretation engine after the electro-optical reader is delivered from a manufacturer to an end user, wherein the user-selected logic includes specifying a set of logical steps that determine the outcome of a decision that includes at least one of (1) whether to proceed to decode more symbols based on decoded data available to the terminal at the moment that calls for the determination of the decision and (2) whether to terminate the decode process based on decoded data available to the terminal at the moment that calls for the determination of the decision; and
    interpreting blocks in the user-selected logic to execute each of the blocks directly, block by block, for instructing the controller with logical conditions under which the other data on the target is to be processed.

9. The method of claim 8, wherein the reading step is performed by a solid-state imager having an array of image sensors for capturing return light from the plurality of data on the target over a field of view.

10. The method of claim 8, and configuring the at least one data as a symbol on the target; and wherein the processing step is performed by decoding the symbol; and wherein the instructing step is performed after the symbol has been decoded.

11. The method of claim 10, wherein the instructing step is performed by instructing the controller to cease processing the other data after the symbol has been decoded.

12. The method of claim 10, wherein the instructing step is performed by instructing the controller to continue processing the other data after the symbol has been decoded.

13. The method of claim 8, and configuring the plurality of data as a plurality of symbols with different symbologies, and wherein the instructing step is performed by instructing the controller to continue processing until a symbol with a known one of the symbologies has been processed.

14. The method of claim 8, and actuating the reader in a single manual action.

* * * * *